United States Patent [19]

Boardman

[11] Patent Number: 5,169,727
[45] Date of Patent: Dec. 8, 1992

[54] SILICONE-BASED PRESSURE-SENSITIVE ADHESIVES HAVING HIGH SOLIDS CONTENT

[75] Inventor: Larry D. Boardman, Shoreview, Minn.

[73] Assignee: Minnesota Mining and Manufacturing Company, St. Paul, Minn.

[21] Appl. No.: 505,772

[22] Filed: Apr. 5, 1990

Related U.S. Application Data

[63] Continuation-in-part of Ser. No. 228,282, Aug. 4, 1988, abandoned.

[51] Int. Cl.$^5$ .................... B32B 25/20; C08G 77/17; C08G 77/20
[52] U.S. Cl. .................... 428/447; 524/588; 524/862; 525/477; 525/478; 528/15; 528/31; 528/32
[58] Field of Search .............. 525/478, 477; 528/15, 528/31, 32; 524/862, 588; 428/447

[56] References Cited

U.S. PATENT DOCUMENTS 3,527,655 9/1970 Ballard ........................... 525/478
3,527,842 9/1970 Clark .

FOREIGN PATENT DOCUMENTS 0158459 10/1985 European Pat. Off. .
0175355 3/1986 European Pat. Off. .
0240162 10/1987 European Pat. Off. .
0269454 1/1988 European Pat. Off. .
2413439 7/1979 France .

Primary Examiner—Ralph H. Dean, Jr.
Attorney, Agent, or Firm—Gary L. Griswold; Walter N. Kirn; David L. Weinstein

[57] ABSTRACT

Pressure-sensitive adhesive composition comprising (a) a benzene soluble, resinous copolymer, (b) a diorganoalkenylsiloxy endblocked polydiorganosiloxane, (c) a diorganohydrogensiloxy endblocked polydiorganosiloxane, (d) an organosiloxane crosslinking agent containing more than two groups that will react with a silicon-bonded hydrogen of a diorganohydrogensiloxy endblocked polydiorganosiloxane by means of a hydrosilation reaction, said organosilicon compound being selected from organosiloxanes having 1 to 15 silicon atoms, and (e) a hydrosilation catalyst in an amount sufficient to effect curing of the composition. The major advantage of the present invention is that solvent need not be used to apply the composition. This non-use of solvent results in savings of material, time, and energy, and reduction in health and safety hazards.

16 Claims, No Drawings

SILICONE-BASED PRESSURE-SENSITIVE ADHESIVES HAVING HIGH SOLIDS CONTENT

This application is a continuation-in-part of U.S. Ser. No. 07/228,282, filed Aug. 4, 1988.

BACKGROUND OF THE INVENTION

1. Field of the Invention

This invention relates to organopolysiloxane compositions and, more particularly, to such compositions that can be cured to produce pressure-sensitive adhesives.

2. Description of the Prior Art

Silicone-based pressure-sensitive adhesives are well known and are commonly prepared by blending copolymeric resins containing triorganosiloxy units and $SiO_{4/2}$ units with silanol endblocked polydiorganosiloxanes, such as taught in U.S. Pat. Nos. 2,736,721, 2,814,601, and 2,857,356.

More recently, organopolysiloxane compositions that are prepared by reacting organopolysiloxanes containing olefinic unsaturation with organopolysiloxanes containing silicon-bonded hydrogen in the presence of a hydrosilation catalyst have been developed for use as molding resins, elastomers, release surfaces, and adhesives. See, for example, U.S. Pat. Nos. 3,699,073, 4,208,504, 4,248,750, and 4,386,135.

The use of a substantially linear diorganohydrogensiloxy endblocked polydiorganosiloxane in combination with a substantially linear diorganovinylsiloxy endblocked polydiorganosiloxane to simulate a high molecular weight polydiorganosiloxane gum while maintaining a low viscosity has been described. See, for example, U.S. Pat. Nos. 3,699,073, 4,340,709, 4,426,240, and 4,535,141.

The curing of silicone-based adhesive compositions by means of a hydrosilation reaction has also been disclosed. See, for example, U.S. Pat. Nos. 3,983,298, 4,051,454, and 4,774,297.

While the hydrosilation reaction of alkenylsiloxanes with hydrosilanes in the presence of a suitable catalyst has been used to prepare potting, molding, and elastomeric products as well as materials useful for providing substrates with a release surface, the reaction has been used only to a limited extent to provide pressure-sensitive adhesives.

SUMMARY OF THE INVENTION

The present invention provides an organopolysiloxane composition having high solids content, which composition can be cured to produce a pressure-sensitive adhesive. The composition comprises a flowable mixture of (a) a benzene soluble, resinous copolymer having triorganosiloxy and $SiO_{4/2}$ units, (b) a diorganoalkenylsiloxy endblocked polydiorganosiloxane, (c) a diorganohydrogensiloxy endblocked, polydiorganosiloxane, (d) an organosilicon crosslinking agent containing more than two groups that will react with a silicon-bonded hydrogen of a diorganohydrogensiloxy endblocked organopolysiloxane by means of a hydrosilation reaction, said organosilicon crosslinking agent being selected from organosilicon compounds having 1 to 15 silicon atoms, and (e) a hydrosilation catalyst in an amount sufficient to effect curing of said composition.

The composition of the present invention can be cured by exposure to ultraviolet radiation or visible light or by heating. The properties of the adhesive, e.g., adhesive strength, shear strength, and tack, can be varied merely by changing the relative concentration of ingredients in the composition.

The major advantage of the present invention is that solvent need not be used to apply the composition. This results in a saving of material, i.e., the solvent, a saving of time, i.e., drying time, a saving of energy, i.e., shorter drying cycle and less solvent to recover, and a reduction in health and safety hazards.

DETAILED DESCRIPTION OF THE INVENTION

The present invention provides an organopolysiloxane composition that can be cured to produce a pressure-sensitive adhesive. The composition comprises a flowable mixture of (a) a benzene soluble, resinous copolymer having triorganosiloxy and $SiO_{4/2}$ units, (b) a diorganoalkenylsiloxy endblocked polydiorganosiloxane, (c) a diorganohydrogensiloxy endblocked polydiorganosiloxane, (d) an organosilicon crosslinking agent containing more than two groups that will react with a silicon-bonded hydrogen of a diorganohydrogensiloxy endblocked organopolysiloxane by means of a hydrosilation reaction, said organosilicon crosslinking agent being selected from organosilicon compounds having 1 to 15 silicon atoms, and (e) a hydrosilation catalyst in an amount sufficient to effect curing of said composition.

The compositions of the present invention can optionally contain additional components such as hydrosilation inhibitors, to extend the pot life of the compositions, photosensitizers, solvents, or fillers, such as, for example, silica, glass microbubbles, or organic polymeric fibers.

In the preferred embodiment of this invention, the benzene soluble, resinous copolymer (a) consists of $R^1R^2R^3SiO_{1/2}$ units and $SiO_{4/1}$ units wherein $R^1$, $R^2$, and $R^3$ independently represent monovalent hydrocarbyl radicals, preferably containing no more than eighteen carbon atoms, there being from 0.6 to 1.0 $R^1R^2R^3SiO_{1/2}$ unit for every $SiO_{4/2}$ unit, at least 95% of all $R^1, R^2$, and $R^3$ radicals being methyl and the total number of $R^1$, $R^2$, and $R^3$ radicals that have olefinic unsaturation being no more than 0.5% of all $R^1$, $R^2$, and $R^3$ radicals.

Resinous copolymers (a) consisting of $R^1R^2R^3SiO_{1/2}$ units and $SiO_{4/2}$ units are well known in the art. These copolymers are described, for example, in U.S. Pat. Nos. 3,936,582, 2,676,182, and 2,857,356. The resinous copolymers can be prepared by cohydrolysis of a mixture of silanes having four hydrolyzable groups, e.g., silicon tetrachloride, and triorganosilanes having one hydrolyzable group, e.g., trimethylchlorosilane, in the proper ratio. A preferred method for the preparation of these resinous copolymers is described in U.S. Pat. No. 2,676,182, wherein a silica hydrosol is reacted under acidic conditions with a source of triorganosiloxy units such as a hexaorganodisiloxane, for example, hexamethyldisiloxane, or a hydrolyzable triorganosilane, for example, trimethylchlorosilane, or mixtures thereof.

The resins obtained from these preparations typically contain from 0.6 to 0.9 triorganosiloxy unit for every $SiO_{4/2}$ unit and contain silicon-bonded hydroxyl radicals ranging from 1 to 4% by weight of the copolymer.

In the preferred embodiment of this invention, the diorganoalkenylsiloxy endblocked polydiorganosiloxane (b) is substantially linear and is essentially free of cyclics, and has the average formula:

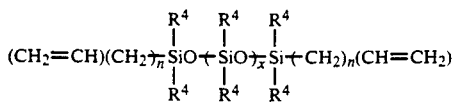

wherein each $R^4$ independently represents a monovalent hydrocarbyl radical selected from alkyl groups, preferably having from 1 to 18 carbon atoms, and aryl groups, preferably phenyl groups, at least 70% of all $R^4$ radicals being methyl, x represents a number ranging from 0 to about 500, preferably from 15 to 50, and each n independently represents a number ranging from 0 to 16.

The diorganoalkenylsiloxy endblocked polydiorganosiloxanes (b) are also well known. They can be prepared by the conventional method of cohydrolysis of a mixture of diorganoalkenylsilanes having one hydrolyzable group and one or more diorganosilanes having two hydrolyzable groups, in the proper ratio.

For example, cohydrolysis of a mixture of two moles of diorganoalkenylchlorosilane with no diorganodichlorosilane would give a diorganoalkenylsiloxy endblocked polydiorganosiloxane in which x is zero; cohydrolysis of a mixture of two moles of diorganoalkenylchlorosilane with 20 moles of diorganodichlorosilane would give a diorganoalkenylsiloxy endblocked polydiorganosiloxane in which x has an average value of about 20. Examples of hydrolyzable organosilanes suitable for this invention other than the organochlorosilanes include the organobromosilanes and the organoacetoxysilanes. Examples of preferred hydrolyzable organosilanes are vinyldimethylchlorosilane, (5-hexenyl)dimethylchlorosilane, dimethyldichlorosilane, methylphenyldichlorosilane, and diphenyldichlorosilane. The hydrolyzable organosilanes and the ratios thereof should be selected so that at least 70% of the organo groups obtained in the diorganoalkenylsiloxy endblocked polydiorganosiloxane are methyl groups. A preferred method for the preparation of diorganoalkenylsiloxy endblocked polydiorganosiloxanes is by equilibration in the presence of an acid or base catalyst of a mixture of a 1,3-dialkenyltetraorganodisiloxane, such as 1,3-divinyltetramethyldisiloxane, and a polyorganocyclopolysiloxane, such as hexamethylcyclotrisiloxane or octamethylcyclotetrasiloxane.

In the preferred embodiment of this invention, the diorganohydrogensiloxy endblocked polydiorganosiloxane (c) is substantially linear and is essentially free of cyclics, and has the average formula:

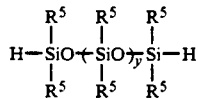

wherein $R^5$ independently represents a monovalent hydrocarbyl radical selected from alkyl groups, preferably having from 1 to 18 carbon atoms, and aryl groups, preferably phenyl groups, at least 70% of all $R^5$ radicals being methyl, and y represents a number ranging from 0 to about 500, preferably from 15 to 50.

The diorganohydrogensiloxy endblocked polydiorganosiloxanes (c) are also well known in the art. They can be prepared by conventional methods that are analogous to the methods for preparing the diorganoalkenylsiloxy endblocked polydiorganosiloxanes, but by using in the cohydrolysis process a hydrolyzable diorganohydrogensilane, such as dimethylchlorosilane, in place of the hydrolyzable diorganoalkenylchlorosilane and in the equilibration process a 1,1,3,3-tetraorganodisiloxane, such as 1,1,3,3-tetramethyldisiloxane, in place of the 1,3-dialkenyltetraorganodisiloxane.

The organosilicon crosslinking agent (d) contains more than two groups that will condense with a silicon-bonded hydrogen of a diorganohydrogensiloxy endblocked polydiorganosiloxane in a hydrosilation reaction, the ratio of the total number of alkenyl groups present in component (b) and groups in component (d) that will react with a silicon-bonded hydrogen of a diorganohydrogensiloxy endblocked polydiorganosiloxane by means of a hydrosilation reaction (d) and (b) to the total number of silicon-bonded hydrogen atoms present in component (c) ranging from 0.8 to 1.2.

In the preferred embodiment of this invention, organosilicon crosslinking agents (d) that are suitable for the composition of the present, invention can be selected from organosilicon compounds having 1 to 15 silicon atoms and having the general formulae:

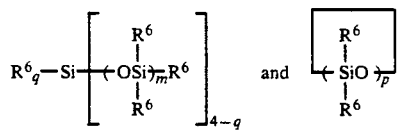

wherein each $R_6$ independently represents a monovalent saturated hydrocarbyl group selected from the group consisting of alkyl groups, preferably having 1 to 18 carbon atoms, aryl groups, preferably phenyl groups, and groups reactive in a hydrosilation reaction with a silicon-bonded hydrogen atom, preferably a vinyl group, q represents a number from 0 to 4, m represents a number from 0 to 14, and p represents a number from 3 to 6, with the proviso that the number of groups reactive in a hydrosilation reaction with a silicon-bonded hydrogen atom is a number greater than 2 but not greater than 15. The crosslinking agents (d) can be prepared by conventional methods analogous to the procedures for preparing the diorganoalkenylsiloxy endblocked polydiorganosiloxanes mentioned previously. For example, a mixture of organoalkenylsilanes and optionally diorganosilanes, each having two hydrolyzable groups and optionally monoorganosilanes having three hydrolyzable groups, can be cohydrolyzed with endstopping organosilanes having only one hydrolyzable group, including diorganoalkenylsilanes.

Examples of organosilanes having two hydrolyzable groups suitable for preparing the crosslinking agents of this invention are methylvinyldichlorosilane and dimethyldichlorosilane. Examples of organosilanes having three hydrolyzable groups suitable for preparing the crosslinking agents of this invention include methyltrichlorosilane and vinyltrichlorosilane. Examples of organosilanes having only one hydrolyzable group suitable for preparing the crosslinking agent of this invention are vinyldimethylchlorosilane and trimethylchlorosilane. Other organosilanes having one, two, or three hydrolyzable groups can be used as can organosilanes having hydrolyzable groups other than the chloro group, such as, for example, bromo, acetoxy and alkoxysilanes.

Crosslinking agents (d) are well known and can be obtained commercially. One example is 1,3,5,7-tetravinyltetramethylcyclotetrasiloxane, available from Petrarch Systems, Inc.

It is preferred that the relative amounts of components (b), (c), and (d) be chosen so that the total number of equivalents of alkenyl groups in the composition is approximately equal to the total number of equivalents of silicon-bonded groups reactive with the alkenyl group in a hydrosilation reaction. However, up to a 20% excess, preferably up to a 10% excess, of either the alkenyl group or the silicon-bonded group reactive with the alkenyl group, i.e., silicon-bonded hydrogen, can be present in the composition.

The hydrosilation catalyst (e) must be present in an amount sufficient to effect the curing of said composition. The hydrosilation catalyst can be any compound that will catalyze the addition reaction of silicon-bonded hydrogen atoms with olefinic double bonds.

Examples of hydrosilation catalysts suitable for the composition of this invention include many of the noble metals, such as rhodium, nickel, palladium, and platinum, and their organometallic complexes. Preferred catalysts are those containing the element platinum, such as finely divided platinum metal, platinum on a finely divided carrier such as charcoal or alumina, and compounds of platinum such as chloroplatinic acid, platinum olefin complexes, such as those described in U.S. Pat. No. 3,159,601, platinum alkyne complexes, such as those described in U.S. Pat. No. 4,603,215, the reaction product of chloroplatinic acid with a member selected from the class consisting of alcohols, ethers, aldehydes and mixtures thereof, such as those described in U.S. Pat. No. 3,220,972, and the reaction product of chloroplatinic acid with tetravinyltetramethylcyclotetrasiloxane in the presence of sodium bicarbonate in ethanol solution, such as those described in U.S. Pat. No. 3,715,334. Particularly preferred catalysts are the complexes prepared from chloroplatinic acid and certain unsaturated organosilicon compounds, such as those described in U.S. Pat. No. 3,419,593, for example, the reaction product of chloroplatinic acid and 1,3-divinyltetramethyldisiloxane. Another particularly preferred catalyst is a colloidal hydrosilation catalyst provided by the reaction between a silicon hydride or a siloxane hydride and a platinum (0) or platinum (II) complex, such as those disclosed in U.S. Pat. No. 4,705,765. Still other particularly preferred catalysts are those which are activated by actinic radiation, such as the ($\eta^4$-1,5-cyclooctadiene)diarylplatinum complexes and the ($\eta^5$-cyclopentadienyl)trialkylplatinum complexes described in U.S. Pat. Nos. 4,530,879 and 4,510,094, respectively.

Depending on the hydrosilation catalyst employed, it may be desirable to include a hydrosilation inhibitor to extend the pot life of the formulation. Hydrosilation inhibitors are well known in the art and include such compounds as acetylenic alcohols, certain polyolefinic siloxanes, pyridine, acrylonitrile, organic phosphines and phosphites, unsaturated amides, and alkyl maleates.

The compositions of this invention can be prepared by combining the resinous copolymer, as a solution state, in a solvent such as toluene or xylene, with the diorganoalkenylsiloxy endblocked polydiorganosiloxane, the diorganohydrogensiloxy endblocked polydiorganosiloxane, and the crosslinking agent, removing the solvent by a suitable method, such as heating the mixture under reduced pressure, and finally adding the hydrosilation catalyst. If one or more of the components (b), (c) or (d) is a low molecular weight material, such as tetravinyltetramethylcyclotetrasiloxane (which can be employed as the crosslinking agent), it is preferable to add these components after removal of solvent from the mixture of (a) and the other components.

If the composition of the invention is not to be used immediately, it is preferable to prepare the composition in two parts. This can be accomplished by first combining part of component (b) with components (a), (c), and (d) and removing the solvent as described above to provide the first part. If the crosslinking agent (d) is a low molecular weight material, it can be added after removal of solvent from the mixture. The second part is provided by combining the remainder of component (b) with the catalyst (e). The compositions of the invention can be provided by simply mixing the two parts.

The composition can be applied to a support by any suitable method, such as, for example, spreading, rolling, etc. The support and the substrate to which the support is adhered can be any solid material, such as a metal, for example, aluminum or steel, a porous material, such as paper, wood, or fabrics, an organic polymeric material, such as polyester, polyamide, polyolefin, etc., a painted surface, or a siliceous material, such as concrete or glass. It is often advantageous to use a flexible substrate. Once applied, the composition can be cured under conditions appropriate to the hydrosilation catalyst employed. For example, if the catalyst is the reaction product of chloroplatinic acid and 1,3-divinyltetramethyldisiloxane, the composition can be cured slowly at room temperature or rapidly by heating. If the catalyst is a ($\eta^5$-cyclopentadienyl)trialkylplatinum complex, the composition can be cured by exposure to actinic radiation, optionally followed by heating.

The major advantage of the adhesive composition of the present invention is that it has an extremely high solids content, typically in excess of 95% by weight, preferably in excess of 98% by weight. Conventional silicone-based pressure-sensitive adhesive compositions have a solids content ranging from 30% by weight to 50% by weight. The accompanying reduction in solvent concentration leads to savings of material, i.e., less solvent being required, savings of time, i.e., less drying time is required, and savings of energy, i.e., a shorter drying cycle is required as there is less solvent to recover. In addition, the reduction in solvent concentration results in a reduction in health and safety hazards.

In order that those skilled in the art may better understand the present invention, the following non-limiting examples are given to illustrate the invention. The following preparations demonstrate the preparation of four of the components of the compositions of this invention.

Preparation A

Resinous Copolymer

A benzene soluble, resinous copolymer consisting essentially completely of trimethylsiloxy units and $SiO_{4/2}$ units was prepared according to U.S. Pat. No. 2,676,182.

A xylene solution of the resinous copolymer contained 60.0% by weight non-volatile resin copolymer. $^{29}Si$ NMR analysis indicated the presence of $(CH_3)_3SiO_{1/2}$, $HOSiO_{3/2}$ and $SiO_{4/2}$ units in a ratio of 41.6:10.5:47.6, corresponding to a hydroxyl content of 2.6% by weight. The copolymer exhibited a number average molecular weight, determined by gel permeation chromatography, of about 2,600 and a dispersity index of 2.6.

Preparation B

Dimethylvinylsiloxy Endblocked Polydimethylsiloxane

A mixture of octamethylcyclotetrasiloxane (1,600 g, 5.384 mol), 1,3-divinyltetramethyldisiloxane (160.9 g, 0.863 mol), concentrated $H_2SO_4$ (1.8 g), and activated carbon (8.8 g) was heated at 100° C. under mechanical stirring for 12 hours. The reaction mixture was filtered, and the filtrate was stripped of volatiles using a thin film evaporator at 250° C. The polymer obtained (1,350 g) was shown by $^1H$ NMR to have an average degree of polymerization of 27.3.

Preparation C

Dimethylhydrogensiloxy Endblocked Polydimethylsiloxane

A mixture of octamethylcyclotetrasiloxane (1,539 g, 5.188 mol), 1,1,3,3-tetramethyldisiloxane (134.4 g, 1.001 mol), concentrated $H_2SO_4$ (1.8 g), and activated carbon (8.7 g) was treated in the same manner as described in Preparation B. The polymer obtained (1,300 g) was shown by $^1H$ NMR to have an average degree of polymerization of 23.1.

Preparation D ($\eta^5$-Cyclopentadienyl)trimethylplatinum

To a slurry of $K_2PtCl_6$ (8.30 g, 17.1 mmol) in a 1:1 mixture of tetrahydrofuran and benzene (170 mL) at 0° C. was added a 1.5 formal solution of methyllithium in diethyl ether (91.0 mL, 136.5 mmol) dropwise with stirring. After the addition was complete, the reaction mixture was allowed to warm slowly to room temperature and stirred overnight. After cooling to 0° C., excess methyllithium was quenched by the dropwise addition of 1,2-dibromoethane (7.3 mL). A saturated solution of potassium iodide in 1 N hydrochloric acid (250 mL) was added dropwise, and the mixture was stirred at 0° C. for one hour. Sufficient water was added to dissolve precipitated salts, the organic phase was separated, and the aqueous phase was extracted twice with diethyl ether. The combined organic phases were washed with water and saturated aqueous sodium chloride, dried over magnesium sulfate, and concentrated. The crude product crystallized from a 1:1 mixture of hexane and toluene to give iodotrimethylplatinum tetramer as red-brown crystals (5.58 g, 89%). To a slurry of the tetramer (3.66 g, 2.5 mmol) in a 1:1 mixture of tetrahydrofuran and toluene (60 mL) at room temperature was added a 1.9 formal solution of cyclopentadienylsodium in tetrahydrofuran (6.32 mL, 12.0 mmol) dropwise with stirring. After stirring for one hour, the reaction mixture was poured into water, the aqueous phase was extracted twice with diethyl ether, and the combined organic phases were washed with saturated aqueous sodium chloride, dried over magnesium sulfate, and concentrated. Flash chromatography (silica, hexane) afforded the desired complex as a colorless solid (2.79 g, 91%).

EXAMPLES 1–15

The following examples illustrate the preparation of adhesives containing varying amounts of resinous copolymer and varying amounts of crosslinking agent. A mixture of 350 g of the 60% by weight solution of resinous copolymer of Preparation A, 53.5 g of the dimethylvinylsiloxy endblocked polydimethylsiloxane of Preparation B, and 77.9 g of the dimethylhydrogensiloxy endblocked polydimethylsiloxane of Preparation C was stripped of volatile material by heating at 65° C. under <0.5 mm of Hg pressure on a rotary evaporator. To the resulting viscous mixture was added 2.10 g of 1,3,5,7-tetravinyltetramethylcyclotetrasiloxane, and the resulting composition was designated Base 1.

A mixture of 350 g of the 60% by weight solution of resinous copolymer of Preparation A, 35.5 g of the dimethylvinylsiloxy endblocked polydimethylsiloxane of Preparation B, and 93.0 g of the dimethylhydrogensiloxy endblocked polydimethylsiloxane of Preparation C was treated similarly and combined with 4.90 g of 1,3,5,7-tetravinyltetramethylcyclotetrasiloxane, and the resulting composition was designated Base 2.

A catalyst solution comprising 6.60 g of the dimethylvinylsiloxy endblocked polydimethylsiloxane of Preparation B and 274 mg of ($\eta^5$-cyclopentadienyl)trimethylplatinum of Preparation D was prepared. Combination of 0.5 g of the catalyst solution with 25.0 g of Base 1, various mixtures of Base 1 and Base 2 totaling 25.0 g, or 25.0 g of Base 2 provided polyorganosiloxane compositions containing 60% by weight of the resinous copolymer of Preparation A, from 1.50 to 3.50% by weight with respect to the remaining 40% by weight of the composition of 1,3,5,7-tetravinyltetramethylcyclotetrasiloxane, and 500 ppm platinum with a silicon-bonded hydrogen to silicon-bonded vinyl ratio of 1.00. These compositions were knife coated at a thickness of 0.05 mm on 0.05 mm thick polyethylene terephthalate film, and the coatings were cured by two passes at a speed of 15 meters per minute under two medium pressure mercury lamps operating at a power of 120 watts per centimeter followed by heating in a forced air oven at 100° C. for five minutes to form a tape. Adhesive tapes containing other than 60% by weight of the resinous copolymer of Preparation A were prepared in essentially the same fashion. The properties of the adhesive tapes so obtained were determined as follows and are summarized in Table I.

Adhesion was determined as follows. Strips of tape, 2.54 cm wide and approximately 25 cm long, prepared as described above, were adhered to either a glass or a bright annealed steel surface using a 2.04 kg rolled weight, essentially as described in ASTM D-3330. Adhesion was measured by peeling the specimens at an angle of 180° at a rate of 230 cm per minute using an Instrumentors, Inc. Model 3M90 slip/peel tester. Aged adhesion data were obtained from samples stored at 70° C. in closed containers for six days. Holding power was measured as follows. Specimens 1.27 cm wide and approximately 8 cm long were adhered to a bright annealed steel surface with an overlap area of 1.27 by 1.27 cm, essentially as described in ASTM D-3654. The samples were suspended vertically and maintained at a temperature of 70° C. for 1 hour. A 1,000 gram weight was suspended from the free end of a specimen. Relative holding power is indicated by the elapsed time before the adhesive bond fails while being maintained at a temperature of 70° C. Tack was measured qualitatively by touching the cured adhesive with a finger.

TABLE I

| Example | Wt % MQ resin[a] | Wt % $D_4Vi_4$[b] | Adhesion (kg/m) initial glass | Adhesion (kg/m) initial steel | Adhesion (kg/m) aged glass | Holding power (min) | Tack |
|---|---|---|---|---|---|---|---|
| 1 | 50 | 1.50 | 31 | 33 | 26 | 4 | moderate |
| 2 | 50 | 2.80 | 10 | 19 | 19 | >10,000 | moderate |

TABLE I-continued

| Example | Wt % MQ resin[a] | Wt % D4Vi4[b] | Adhesion (kg/m) initial glass | initial steel | aged glass | Holding power (min) | Tack |
|---|---|---|---|---|---|---|---|
| 3 | 55 | 1.50 | 56 | 51 | 59 | 10 | moderate |
| 4 | 55 | 2.50 | 37 | 37 | 32 | 2,000 | moderate |
| 5 | 55 | 2.80 | 33 | 33 | 31 | >10,000 | moderate |
| 6 | 58 | 1.67 | 66 | 68 | 67 | 16 | moderate |
| 7 | 58 | 2.35 | 59 | 58 | 61 | 82 | low |
| 8 | 58 | 2.80 | 56 | 51 | 40 | 1,000 | low |
| 9 | 58 | 3.19 | 42 | 45 | 45 | >10,000 | low |
| 10 | 60 | 1.67 | 78 | 86 | 78 | 99 | moderate |
| 11 | 60 | 2.32 | 75 | 65 | 74 | 343 | low |
| 12 | 60 | 2.79 | 65 | 63 | 65 | 3,000 | low |
| 13 | 60 | 3.19 | 60 | 52 | 51 | >10,000 | low |
| 14 | 65 | 1.50 | 52[c] | 37[c] | — | 114 | low |
| 15 | 65 | 2.80 | 8[c] | 11[c] | — | 1,200 | none |

[a]Resinous copolymer
[b]1,3,5,7-tetravinyltetramethylcyclotetrasiloxane
[c]Adhesion shocky As can be seen from the data in Table I, holding power increases while tack decreases with the level of crosslinking agent; adhesion decreases with the level of crosslinking agent and increases with the level of resinous copolymer up to a level of about 60% by weight.

EXAMPLES 16–21

The compositions of the examples summarized in Table II were prepared in the same manner as were the compositions of Examples 1 to 15, except that the hydrosilation catalyst prepared by the reaction of chloroplatinic acid with 1,3-divinyltetramethyldisiloxane was used in place of($\eta^5$-cyclopentadienyl)trimethylplatinum. Coated adhesives were cured by heating at 100° C. for five minutes. As can be seen from the data in Table II, substantially the same adhesive properties are obtained using either the catalyst of Examples 1–15 or the catalyst of Examples 16–21.

TABLE II

| Example | Wt % MQ resin[a] | Wt % D4Vi4[b] | Adhesion (kg/m) initial glass | initial steel | aged glass | Holding power (min) | Tack |
|---|---|---|---|---|---|---|---|
| 16 | 58 | 1.80 | 65 | — | 67 | 45 | moderate |
| 17 | 58 | 2.45 | 59 | — | 58 | 62 | low |
| 18 | 60 | 1.80 | 76 | — | 76 | 105 | moderate |
| 19 | 60 | 2.33 | 67 | — | 69 | 500 | low |
| 20 | 60 | 2.80 | 64 | — | 61 | 3,000 | low |
| 21 | 60 | 3.20 | 62 | — | 52 | >10,000 | low |

[a]Resinous copolymer
[b]1,3,5,7-tetravinyltetramethylcyclotetrasiloxane

EXAMPLES 22–30

The compositions of the examples summarized in Table III were prepared in essentially the same manner as were the compositions of Examples 1 to 15, except that the quantities were adjusted to provide silicon-bonded hydrogen to silicon-bonded vinyl ratios of from 0.7 to 1.3. Each example incorporated 60% by weight of the resinous copolymer of Preparation A, 2.80% by weight with respect to the remaining 40% by weight of the composition of 1,3,5,7-tetravinyltetramethylcyclotetrasiloxane, and 500 ppm platinum as ($\eta^5$-cyclopentadienyl)trimethylplatinum.

TABLE III

| Example | Ratio of SiH/SiVi[a] | Adhesion (kg/m) initial glass | initial steel | aged glass | Holding power (min) | Tack |
|---|---|---|---|---|---|---|
| 22 | 0.7 | —[b] | —[b] | —[b] | — | moderate |
| 23 | 0.8 | 93 | 86 | 67 | 20 | moderate |
| 24 | 0.9 | 74 | 73 | 70 | 70 | moderate |
| 25 | 0.95 | 67 | 65 | 69 | 50 | low |
| 26 | 1.0 | 64 | 59 | 56 | 288 | low |
| 27 | 1.05 | 53 | 59 | 58 | >10,000 | low |
| 28 | 1.1 | 50 | 52 | 52 | >10,000 | low |
| 29 | 1.2 | 41 | 40 | 17 | >10,000 | low |
| 30 | 1.3 | 22[c] | 28[c] | 4 | — | none |

[a]Ratio of silicon-bonded hydrogen groups to silicone-bonded vinyl groups
[b]Cohesive failure
[c]Adhesion shocky As can be seen from the data in Table III, a slight excess of silicon bonded hydrogen may be advantageously used to improve the holding power of the adhesive with minimal reduction in adhesion.

EXAMPLE 31 AND COMPARATIVE EXAMPLES A, B, C, D, AND E

The compositions of Example 31 and Comparative Examples A, B, C, D, and E were prepared in essentially the same manner as were the compositions of Examples 1–15, except that the crosslinking agent was selected from the following group of materials: 1,3,5,7-tetravinyltetramethylcyclotetrasiloxane (Example 31), 1,3,5,7-tetramethylcyclotetrasiloxane (Comparative Example A), a polyorganosiloxane having two $(CH_3)_3SiO_{1/2}$ units, on average thirteen $Si(CH=CH_2)CH_3O_{2/2}$ units, and on average fifty-eight $Si(CH_3)_2O_{2/2}$ units in a 2:13:58 ratio (Comparative Example B), a polyorganosiloxane having two $(CH_3)_3SiO_{1/2}$ units, on average thirteen $SiH(CH_3)_2O_{2/2}$ units, and on average fifty-eight $Si(CH_3)_2O_{2/2}$ units in a 2:13:58 ratio (Comparative Example C), a polyorganosiloxane having on average fifteen $(CH_2=CH)(CH_3)_2SiO_{1/2}$ units and on average thirty $(CH_3)SiO_{3/2}$ units in a 15:30 ratio (Comparative Example D), and a polyorganosiloxane having on average twenty five $H(CH_3)_2SiO_{1/2}$ units and on average twenty-five $(CH_3)SiO_{3/2}$ units in a 25:25 ratio (Comparative Example E). The composition of each example incorporated 60% by weight of the resinous copolymer of Preparation A, an amount of crosslinking agent sufficient to provide the same number of silicon-bonded vinyl groups or silicon-bonded hydrogen atoms as the number of silicon-bonded vinyl groups provided by the amount of 1,3,5,7-tetravinyltetramethylcyclotetrasiloxane in an analogous composition containing 3% by weight of 1,3,5,7-tetravinyltetramethylcyclotetrasiloxane with respect to the remaining 40% by weight of the composition, and 500 ppm platinum as ($\eta^5$-cyclopentadienyl)trimethylplatinum. The compositions of Example 31 and Comparative Examples A, B, C, D, and E were coated and cured in the same manner as were the compositions of Examples 1–15.

TABLE IV

| Example | Adhesion (kg/m) initial glass | initial steel | aged glass | Holding power (min) | Tack |
|---|---|---|---|---|---|
| 31 | 66 | 65 | 65 | >10,000 | low |
| Comparative A[a] | — | — | — | — | — |
| Comparative B | 28[b] | 28[b] | 6[b] | >10,000 | none |
| Comparative C | 11[b] | 10[b] | 10[b] | >10,000 | none |
| Comparative D[a] | — | — | — | — | — |

TABLE IV-continued

| | Adhesion (kg/m) | | | Holding | |
| | initial | | aged | power | |
| Example | glass | steel | glass | (min) | Tack |
| Comparative E[a] | — | — | — | — | — |

[a]The composition failed to cure.
[b]Adhesion shocky

As can be seen from the data in Table IV, the best combination of adhesive properties is obtained from the composition incorporating 1,3,5,7-tetravinyltetramethylcyclotetrasiloxane as the crosslinking agent (Example 31).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composition capable of being cured to form a pressure-sensitive adhesive comprising a flowable mixture of:
   (a) 50 to 65 parts by weight of a benzene soluble, resinous copolymer having triorganosiloxy and $SiO_{4/2}$ units,
   (b) a diorganoalkenylsiloxy endblocked polydiorganosiloxane having up to 502 silicon atoms,
   (c) a diorganohydrogensiloxy endblocked polydiorganosiloxane having up to 502 silicon atoms,
   (d) an organosilicon crosslinking agent containing more than two groups that will react with a silicon-bonded hydrogen of a diorganohydrogensiloxy endblocked polydiorganosiloxane by means of a hydrosilation reaction, said organosilicon crosslinking agent having 1 to 15 silicon atoms, the sum of parts by weight of said (b) diorganoalkenylsiloxy endblocked polydiorganosiloxane plus said (c) diorganohydrogensiloxy endblocked polydiorganosiloxane plus said (d) organosilicon crosslinking agent being 50 to 35 parts by weight, and
   (e) a hydrosilation catalyst in an amount sufficient to effect the curing of said composition.

2. The composition of claim 1, comprising 50 to 65 parts by weight of component (a) and 50 to 35 parts by weight of components (b) plus (c) plus (d), the ratio of the total number of alkenyl groups present in component (b) and groups in component (d) that will react with a silicon-bonded hydrogen of a diorganohydrogensiloxy endblocked polydiorganosiloxane by means of a hydrosilation reaction to the total number of silicon-bonded hydrogen atoms present in component (c) ranging from about 0.8 to about 1.2.

3. The composition of claim 1, wherein the benzene soluble, resinous copolymer having triorganosiloxy and $SiO_{4/2}$ units consists of $R^1R^2R^3SiO_{1/2}$ units and $SiO_{4/2}$ units wherein $R^1$, $R^2$, and $R^3$ independently represent monovalent hydrocarbyl radicals, there being from 0.6 to 1.0 $R^1R^2R^3SiO_{1/2}$ for every $SiO_{4/2}$ unit, at least 95% of all $R^1$, $R^2$, and $R^3$ radicals being methyl and the total number of $R^1$, $R^2$, and $R^3$ radicals that have olefinic unsaturation being no more than 0.5% of all $R^1$, $R^2$, and $R^3$ radicals.

4. The composition of claim 3 wherein $R^1$, $R^2$, and $R^3$ contain no more than eighteen carbon atoms.

5. The composition of claim 1, wherein the diorganoalkenylsiloxy endblocked polydiorganosiloxane has the average formula:

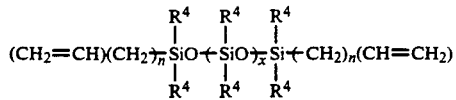

wherein each $R^4$ independently represents a monovalent group selected from the group consisting of alkyl groups and aryl groups, with at least 70% of the $R^4$ groups being methyl, x represents zero or a number having a value up to about 500, and each n independently represents zero or a number having a value up to 16.

6. The composition of claim 5, wherein x represents a number having a value of from 15 to 50.

7. The composition of claim 5, wherein each $R^4$ independently represents a monovalent group selected from the group consisting of alkyl groups having 1 to 18 carbon atoms and phenyl groups.

8. The composition of claim 1, wherein the diorganohydrogensiloxy endblocked polydiorganosiloxane has the average formula:

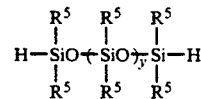

wherein each $R^5$ independently represents a monovalent group selected from the group consisting of alkyl groups and aryl groups, with at least 70% of the $R^5$ groups being methyl, and y represents zero or a number having a value up to about 500.

9. The composition of claim 8, wherein y represents a number having a value of from 15 to 50.

10. The composition of claim 8, wherein each $R^5$ independently represents a monovalent group selected from the group consisting of alkyl groups having 1 to 18 carbon atoms and phenyl groups.

11. The composition of claim 1, wherein the organosilicon crosslinking agent is selected from the group consisting of:

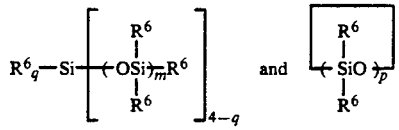

wherein each $R^6$ independently represents a monovalent saturated hydrocarbyl group selected from the group consisting of alkyl groups, aryl groups, and groups reactive in a hydrosilation reaction with a silicon-bonded hydrogen atom, q represents a number from 0 to 4, m represents a number form 0 to 14, and p represents a number form 3 to 6, with the proviso that the number of groups reactive in a hydrosilation reaction with a silicon-bonded hydrogen atom is a number greater than 2 but not greater than 15.

12. The composition of claim 11, wherein each $R^6$ independently represents a monovalent group selected from the group consisting of alkyl groups having 1 to 18 carbon atoms, phenyl groups, and groups reactive in a hydrosilation reaction with a silicon-bonded hydrogen atom.

13. The composition of claim 11, wherein at least three of said $R^6$ represents a vinyl group.

14. The composition of claim 1, further including up to 5% by weight of solvent, based on weight of the composition.

15. A pressure-sensitive adhesive article comprising a substrate bearing a layer of the cured composition of claim 1.

16. The pressure-sensitive adhesive article of claim 15, wherein the substrate is flexible.

* * * * *

UNITED STATES PATENT AND TRADEMARK OFFICE
CERTIFICATE OF CORRECTION

PATENT NO. : 5,169,727
DATED : December 8, 1992
INVENTOR(S) : Boardman

It is certified that error appears in the above-identified patent and that said Letters Patent is hereby corrected as shown below:

Col. 11, line 62, "$R^1R^2R^3SiO_{1/2}$ for" should be
--$R^1R^2R^3SiO_{1/2}$ unit for--.

Signed and Sealed this

Twenty-sixth Day of April, 1994

*Attest:*

BRUCE LEHMAN

*Attesting Officer*   Commissioner of Patents and Trademarks